March 1, 1966  L. J. MICHAUD  3,237,833
ATTACHMENT FOR SOLDERING TOOL
Filed May 4, 1964
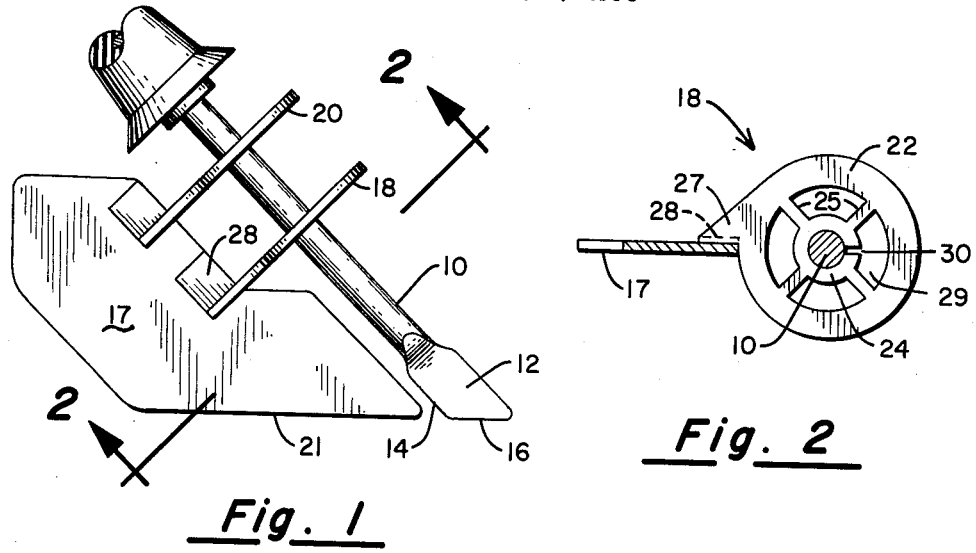
Fig. 1
Fig. 2
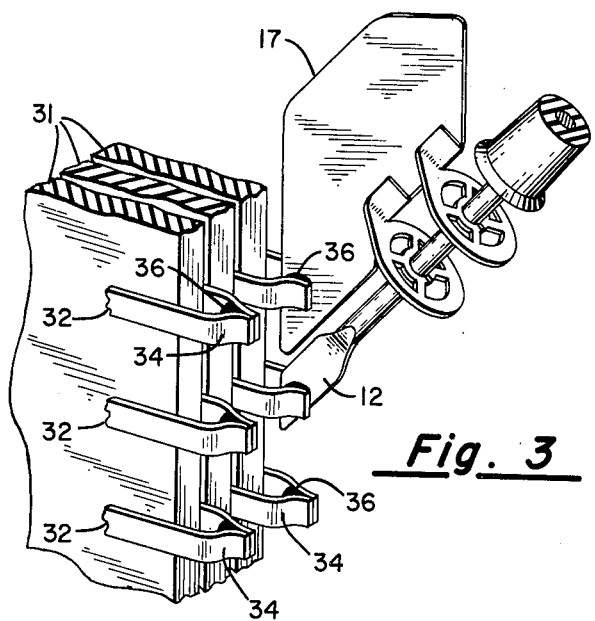
Fig. 3
INVENTOR.
LAWRENCE J. MICHAUD
BY
ATTORNEY United States Patent Office 3,237,833
Patented Mar. 1, 1966

3,237,833
ATTACHMENT FOR SOLDERING TOOL
Lawrence J. Michaud, Forest Lake, Minn., assignor to Sperry Rand Corporation, New York, N.Y., a corporation of Delaware
Filed May 4, 1964, Ser. No. 364,662
3 Claims. (Cl. 228—13)

The present invention relates generally to soldering tools and more particularly to apparatus for use with a soldering iron for assisting in disconnecting elements physically joined by solder.

Many modern electronic devices are constructed of elemental parts and subassemblies which are conveniently and commonly electrically and physically interconnected by solder joints. In repairing these devices for maintaining them in good operating condition, it is frequently necessary to interrupt or disconnect some of thet solder joints. Conventionally, the disconnection is made by fusing the solder in the area of the solder joint, and, while the solder is liquid or molten, the elements which had been connected by the solder joints are physically separated and maintained in a spaced-apart or separated relationship until the liquid solder has cooled sufficiently to avoid reformation of the solder joint. Unfortunately, the construction of some electronic devices is such that separating and maintaining the unsoldered elements in spaced-apart relationship unitil the solder has cooled is not conveniently accomplished. In some electronic devices the packaging scheme calls for a plurality of electronic components and elements to be disposed in extremely close relationship to one another. It can be readily seen that under such circumstances, the physical separating of two or more unsoldered elements would have to be accomplished using extreme care to prevent the molten solder associated with one of the elements from undesirably contacting some other nearby element in the unit and to avoid substantially distorting the relative arrangement or geometry of the elements.

Accordingly it is an object of the present invention to provide apparatus for assisting in disconnecting elements joined together by solder or the like.

It is another object of the present invention to provide apparatus which is adapted to be mounted on a conventional soldering tool and may be utilized therewith to facilitate unsoldering solder connections.

It is another object of the present invention to provide a fin-like appendage adapted for mounting on a conventional soldering iron which follows the motion of the soldering iron moving between soldered elements after the solder forming the joint between the elements has been melted.

It is yet another object of the present invention to provide a fin-like appendage adapted for mounting on a conventional soldering iron which, when moved between soldered elements after the solder therebetween has been melted, is effective as a heat sink for causing the liquified solder to cool rapidly and solidify.

It is a still further object of the present invention to provide a fin-like apparatus adapted to be employed with conventional soldering irons for assisting in the unsoldering of soldered connections, which apparatus is simple in construction and economically fabricated.

The above and other objects are accomplished in accordance with the present invention by provision of a substantially flat, non-solder-wettable, fin-like structure which includes means adapted for permitting the fin-like structure to be secured to a conventional soldering tool. When properly arranged upon a soldering iron of the type having a tubular shank the fin-like structure projects radially outwardly from the iron and appears as an appendage thereon. The fin-like structure is arranged such that one edge thereof is in substantial alignment with the heating tip of the soldering iron. In operation, heat from the soldering iron is used to fuse the solder forming the joint connecting two or more elements or components, and after the solder has been melted, the fin-like appendage is located between the elements for maintaining them in separated or spaced-apart relationship until the melted solder has cooled and solidified. The fin structure is fabricated from a material which does not readily adhere to solder and which is considered a good thermal conductor for permitting the fin to act as a heat sink. As a heat sink, the fin is utilized to withdrawn and dissipate heat from the melted solder for permitting the liquid solder to cool rapidly.

The novel features of the invention, as well as additional objects and advantages thereof, will be understood more fully from the following description when read in connection with the accompanying drawings, in which:

FIG. 1 is a side elevational view of the apparatus of the present invention, along with a fragmentary view of a typical hand soldering iron with which the apparatus of the present invention may be conveniently employed;

FIG. 2 is a cross-sectional view taken along the lines 2—2 and in the direction of the arrows of FIG. 1;

FIG. 3 is a fragmentary, perspective view of a printed circuit assembly and an embodiment of the present invention as they would appear during the disconnection of the solder joints connecting the various printed circuit tabs.

Referring now to the drawings and more particularly to FIGS. 1 and 2, there may be seen a preferred embodiment of the present invention. A fragmentary portion of a soldering tool is illustrated for indicating a typical soldering iron which may be readily and conveniently employed with the present invention. A suitable soldering tool would be the Imperiar soldering iron which is sold by Ungar Electric Tools, Electronic Division of Eldon Industries, Inc., Hawthorne, California.

The soldering iron's shank portion 10 is preferably provided with a flat tip portion 12 exhibiting knife-like edges 14 and 16 having an edge thickness in the range of 0.010 to 0.020 inch. Alternatively the heating tip portion 12 may be formed with a needle-like or spade-like geometry.

A fin-like appendage or structure 17 is attached to and spaced from the iron's shank 10 by a support or securing means made up of two similar parts or brackets 18 and 20. The fin member 17 is fabricated from a material that preferably is non-solder-wettable, that is, a material that will not readily lend itself to wetting by conventional solder alloys. Additionally it is preferable that the fin member material exhibit good heat conducting characteristics. Metallic materials, such as, stainless steel and aluminum have been found generally acceptable, and more particularly, fin members stamped from 300 Series stainless steel sheet have been found to perform satisfactorily. The brackets 18 and 20 may also be conveniently formed from stainless steel; however, it should be appreciated that it is generally desirable that the brackets be poor heat conductors in order to avoid or limit the transfer of heat from the shank 10 via the brackets 18 and 20 to the fin member 17. Thus the brackets may be advantageously formed from a ceramic or other type of material generally considered a poor thermal conductor. The fin member 17 has a uniform thickness in the range of about 0.010 to 0.020 inch, and when the fin is properly arranged with respect to the shank 10, its edge 21 is substantially aligned with the edge 16 of the tip portion 12.

Because the bracket members 18 and 20 are substantially identical, the description hereinafter of the bracket 18 is intended to apply equally as well to the member 20.

The bracket 18, as may be best seen in FIG. 2, is generally annular in shape and includes an outer ring-shaped portion 22 and an inner ring-shaped portion 24, the two ring portions being spaced apart and interconnected by four radially extending heat restrictor bars 25. The heat restrictor bars are designed such that they are effective to minimize the amount of heat transferred from the shank 10 to the fin member 17. The spaces or openings 27 between the restrictor bars 25 are also effective to minimize heat transfer by permitting heat emanating from the shank to be dissipated by air currents flowing through the openings. The outer ring 22 has a tangetially extending flange portion 27 which is provided with a projection 28 that is arranged perpendicular with respect to the flange. The projection 28 is utilized to secure bracket member to the fin member. When the brackets are formed from a suitable metallic material, they may be joined to the fin member by welding. However, appropriate types of high temperature adhesives or mechanical bonding means, such as bolts or the like, may also be used to secure the brackets to the fin member. The inner annular ring 24 is effective as a means to secure the bracket to the shank of the soldering iron and in connection with this function, the ring 24 is provided with a slot 30 therethrough for permitting the ring 24 to be slightly expandable. Preferably, the diameter of the shank 10 is slightly greater than the inside diameter of the ring 24 in its unexpanded position, such that when the bracket is mounted upon the shank, it is secured thereto by a frictional fit. Effectively the inner portion of the ring 24 clamps or clenches the shank portion of the soldering iron. This type of attachment has been found desirable for the reason that it permits the fin member and mounting brackets to be moved longitudinally or circumferentially with respect to the shank 10 and thus facilitates aligning the fin 17 with the tip 12 of the soldering iron. No limitation is intended by such a mounting technique, however, and other means of attaching the appendage to the soldering iron will suggest themselves to those skilled in the art.

The operation of the present invention is discussed in connection with FIG. 3 wherein there may be seen a fragmentary view of a plurality of conventional printed circuit members 31 arranged in closely spaced relation. Each of the printed circuit members includes a plurality of conductors 32, only portions of which are illustrated for purposes of clarity, which terminate in terminal tip portions 34 which extend outwardly beyond the edge of the circuit members. Inasmuch as the particular circuitry arrangement disposed on each of the circuit members is not critical to the present invention, the circuitry merely being specific to the ultimate application of the assembly, there is no attempt to illustrate or specify the internal arrangement of the conductors. The manner in which the conductors are secured or formed on the insulation portion of the printed circuit members is also not critical and, accordingly, discussion relative thereto is deemed unnecessary.

For electrically and physically interconnecting selected ones of the conductors arranged on the circuit members, appropriate terminal tip portions 34 of the conductors are physically united by a solder joint, for example, as is illustrated at 36. When it is desired to separate the circuit members of the assembly, it becomes necessary to disconnect the solder joints. For disconnecting or interrupting the solder joints, an edge of the heated tip portion 12 is placed in contact with the solder joint which is intended to be disconnected. The edges of the tip portion 12 are sufficiently sharp such that, as the heat from the iron causes the solder to melt, a slight pressure applied to the iron in a downward direction causes the tip portion to force its way between the terminal tabs. As soon as the solder forming the joint has melted and the blade 12 has been fully inserted between the terminal tabs, the tip portion is moved into contact with the next solder joint to be disconnected. As the tip portion 12 is moved downwardly to contact the next solder joint, the fin member 17 following the soldering iron tip portion, moves between the terminal tabs for keeping them separated until the residual molten solder in the area has sufficiently cooled on the tabs so that a solder joint between the tabs will not be reformed when the fin is removed from between the tabs. In a preferred embodiment of the present invention, the space between the edge 14 of the tip portion 12 and the adjacent edge of the fin member 17 is less than the thickness of the terminal tabs such that a portion of the fin member is disposed between the unsoldered terminal tabs before the tip portion 12 has been completely removed from between the tabs. The edge 21 of the fin member 17 is preferably long enough to permit the tip portion 12 to engage one set of joined terminal tabs while a portion of the fin member is disposed between an adjacent set of tabs. For cooling the fused solder, the fin member acts as a heat sink, absorbing heat from the molten solder and thus causing the solder to solidify rapidly.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. Apparatus for use in combination with a soldering iron for assisting in disconnecting a solder joint formed between two or more elements comprising: a soldering iron having a heating tip portion; a member secured to the soldering iron and having a portion thereof arranged adjacent to and in substantial alignment with the heating tip of the soldering iron, the portion being disposed between the elements after the solder has been melted by the action of the soldering iron for maintaining the elements in separated relationship until the molten solder has substantially solidified.

2. Apparatus for use in combination with a soldering iron for assisting in disconnecting a solder joint formed between two or more elements comprising: a soldering iron having a heating tip portion; a substantially flat, non-solder-wettable, fin-like member secured to the soldering iron and having a portion thereof arranged adjacent to and in substantial alignment with the heating tip of the soldering iron, the portion being disposed between the elements after the solder has been melted by the action of the soldering iron for maintaining the elements in separated relationship until the molten solder has substantially solidified.

3. Apparatus for use in combination with a soldering iron for assisting in disconnecting a solder joint formed between two or more elements comprising: a soldering iron having a heating tip portion; a substantially flat, non-solder-wettable, fin-like member fabricated from a material capable of acting as a heat sink secured to the soldering iron and having an edge portion thereof arranged spacedly adjacent to and in substantial alignment with the heating tip of the soldering iron, the portion being disposed between the elements after the solder has been melted by the action of the soldering iron for maintaining the elements in separated relationship until the molten solder has substantially solidified.

References Cited by the Examiner

UNITED STATES PATENTS 3,121,781   2/1964   Schoenwald _____ 228—59

WHITMORE A. WILTZ, *Primary Examiner.*

M. L. FAIGUS, *Assistant Examiner.*